United States Patent
Suwabe

(10) Patent No.: US 10,373,641 B2
(45) Date of Patent: Aug. 6, 2019

(54) OPTICAL RECORDING MEDIUM

(71) Applicant: Sony Corporation, Tokyo (JP)

(72) Inventor: Masatsugu Suwabe, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/779,224

(22) PCT Filed: Nov. 10, 2016

(86) PCT No.: PCT/JP2016/004861
§ 371 (c)(1),
(2) Date: May 25, 2018

(87) PCT Pub. No.: WO2017/094227
PCT Pub. Date: Jun. 8, 2017

(65) Prior Publication Data
US 2018/0350401 A1    Dec. 6, 2018

(30) Foreign Application Priority Data

Dec. 1, 2015  (JP) .................................. 2015-234914

(51) Int. Cl.
G11B 7/24        (2013.01)
G11B 7/24041     (2013.01)
(Continued)

(52) U.S. Cl.
CPC ........ G11B 7/24041 (2013.01); G11B 7/2433 (2013.01); G11B 7/24038 (2013.01);
(Continued)

(58) Field of Classification Search
CPC . G11B 7/24041; G11B 7/2433; G11B 7/2578; G11B 2007/2571
See application file for complete search history.

(56) References Cited

U.S. PATENT DOCUMENTS

| | | |
|---|---|---|
| 2009/0286036 A1 | 11/2009 | Sekiguchi et al. |
| 2012/0027980 A1 | 2/2012 | Kurokawa et al. |
| 2012/0201993 A1 | 8/2012 | Tabata |

FOREIGN PATENT DOCUMENTS

| | | |
|---|---|---|
| JP | 2005-154820 A | 6/2005 |
| JP | 2008-097791 A | 4/2008 |

(Continued)

OTHER PUBLICATIONS

International Search Report and Written Opinion and English translation thereof dated Feb. 7, 2017 in connection with International Application No. PCT/JP2016/004861.

(Continued)

*Primary Examiner* — Elizabeth E Mulvaney
(74) *Attorney, Agent, or Firm* — Wolf, Greenfield & Sacks, P.C.

(57) ABSTRACT

An optical recording medium includes a plurality of information signal layers, and at least one of the plurality of information signal layers other than the farthest information signal layer from a light irradiation surface includes: a recording layer; a first dielectric layer provided on a side opposite to a light incident side of the recording layer; and a second dielectric layer provided on the light incident side of the recording layer. The first dielectric layer and the second dielectric layer include indium oxide and tin oxide, and the atomic concentration of tin in the first dielectric layer is higher than the atomic concentration of tin in the second dielectric layer.

8 Claims, 5 Drawing Sheets

(51) Int. Cl.
*G11B 7/24038* (2013.01)
*G11B 7/2433* (2013.01)
*G11B 7/2578* (2013.01)
G11B 7/257 (2013.01)

(52) U.S. Cl.
CPC .... *G11B 7/2578* (2013.01); *G11B 2007/2571* (2013.01); *G11B 2007/25715* (2013.01)

(56) References Cited

FOREIGN PATENT DOCUMENTS

| JP | 2009-129526 A | 6/2009 |
| JP | 2012-033217 A | 2/2012 |
| JP | 2012-139876 A | 7/2012 |
| JP | 2012-164374 A | 8/2012 |

OTHER PUBLICATIONS

International Preliminary Report on Patentability and English translation thereof dated Jun. 14, 2018 in connection with International Application No. PCT/JP2016/004861.

OPTICAL RECORDING MEDIUM

CROSS REFERENCE TO RELATED APPLICATIONS

This is a U.S. National Stage Application under 35 U.S.C. § 371, based on International Application No. PCT/JP2016/004861, filed Nov. 10, 2016, which claims priority to Japanese Patent Application JP 2015-234914, filed Dec. 1, 2015, each of which is hereby incorporated by reference in its entirety.

TECHNICAL FIELD

The present technology relates to an optical recording medium including a plurality of information signal layers.

BACKGROUND ART

In recent years, technology for providing multiple information signal layers has been widely adopted in the field of optical recording media in order to further increase the recording capacity. Information signal layers of a multilayer optical recording medium other than the farthest information signal layer from the medium surface are required to have a high transmittance and a small transmittance change before and after recording.

In the field of multilayer optical recording media, various film configurations have been studied with regard to information signal layers other than the farthest information signal layer from a medium surface. For example, Patent Document 1 proposes a film configuration in which a protective layer (dielectric layer) mainly containing indium oxide and tin oxide is provided on at least one side of a transmissive recording layer.

CITATION LIST

Patent Document
Patent Document 1: Japanese Patent Application Laid-Open No. 2009-129526

SUMMARY OF THE INVENTION

Problems to be Solved by the Invention

An object of the present technology is to provide an optical recording medium capable of improving the transmittance of information signal layers and suppressing fluctuations in the transmittance of information signal layers before and after recording.

Solutions to Problems

In order to solve the above problem, a first technology is an optical recording medium including a plurality of information signal layers, at least one of the plurality of information signal layers other than the farthest information signal layer from a light irradiation surface includes: a recording layer; a first dielectric layer provided on a side opposite to a light incident side of the recording layer; and a second dielectric layer provided on the light incident side of the recording layer, the first dielectric layer and the second dielectric layer include indium oxide and tin oxide, and the atomic concentration of tin in the first dielectric layer is higher than the atomic concentration of tin in the second dielectric layer.

A second technology is an optical recording medium including a plurality of information signal layers, at least one of the plurality of information signal layers other than the farthest information signal layer from a light irradiation surface includes: a recording layer; a first dielectric layer provided on a side opposite to a light incident side of the recording layer; and a second dielectric layer provided on the light incident side of the recording layer, the first dielectric layer and the second dielectric layer include indium oxide and tin oxide, and the atomic concentration of tin in the first dielectric layer in the vicinity of an interface on the light incident side of the first dielectric layer is higher than the atomic concentration of tin in the second dielectric layer.

Effects of the Invention

As described above, the transmittance of information signal layers can be improved, and fluctuations in the transmittance of information signal layers before and after recording can be suppressed.

MODE FOR CARRYING OUT THE INVENTION

An optical recording medium of the present technology preferably includes a plurality of information signal layers on a substrate and a cover layer on the information signal layers. The thickness of the cover layer is not particularly limited, and the cover layer includes a substrate, a sheet, a coating layer, and the like. Since an objective lens with a high NA is used in a high-density optical recording medium, a thin light transmission layer such as a sheet and a coating layer is preferably adopted as a cover layer, and light is preferably radiated through the light transmission layer to record or reproduce information signals. In this case, it is also possible to adopt a substrate having opacity. An incident surface for light for recording or reproducing information signals is appropriately set on at least one of the cover layer side surface and the substrate side surface according to the format of the optical recording medium.

Alternatively, an optical recording medium of the present technology is preferably a bonded optical recording medium in which two disks including a plurality of information signal layers are bonded together via a bonding layer. In the case of this configuration, a spacer layer is preferably provided between information signal layers. In addition, a disk preferably includes a plurality of information signal layers on a substrate and a cover layer as a light transmission layer on the information signal layers. In the case of this bonded optical recording medium, incident surfaces for light for recording or reproducing information signals are set on both sides of the optical recording medium.

Embodiments of the present technology will be described in the following order.
1 Configuration of Optical Recording Medium
2 Method for Manufacturing Optical Recording Medium
3 Effect
4 Modification

[1 Configuration of Optical Recording Medium]

Figure 1:
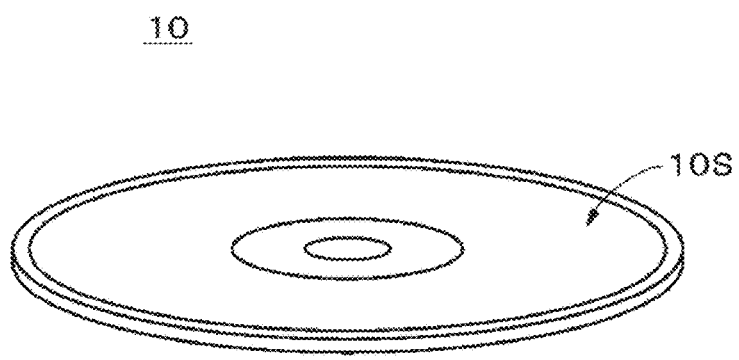
FIG. 1A is a perspective view illustrating an exemplary appearance of an optical recording medium according to an embodiment of the present technology.
FIG. 1B is a schematic cross-sectional diagram illustrating an exemplary configuration of the optical recording medium according to the embodiment of the present technology.
Figure 1:
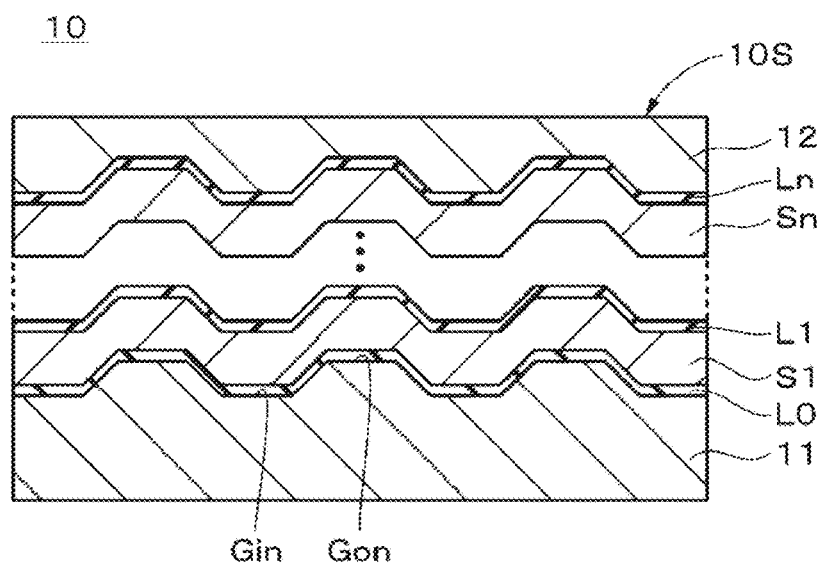

As illustrated in FIG. 1A, an optical recording medium 10 according to an embodiment of the present technology has a disk shape including an opening (hereinafter referred to as a "center hole") in the center. Note that the shape of the optical recording medium 10 is not limited to this example, and the optical recording medium 10 may have a card shape or the like.

As illustrated in FIG. 1B, the optical recording medium 10 is what is called a multilayer recordable optical recording medium, and includes an information signal layer L0, an intermediate layer S1, an information signal layer L1, ..., an intermediate layer Sn, an information signal layer Ln, and a light transmission layer 12 that is a cover layer. These layers are stacked on one main surface of a substrate 11 in this order. The information signal layer L0 is located on the farthest side from a surface C of the light transmission layer 12, and the information signal layers L1 to Ln are located closer to the surface C than the information signal layer L0 is. Note that n is, for example, an integer of one or more, and preferably an integer of two or more or three or more.

In the optical recording medium 10 according to this embodiment, information signals are recorded or reproduced by irradiating the information signal layers L0 to Ln with laser through the surface C of the light transmission layer 12. For example, laser light having a wavelength in the range of 400 to 410 nm is collected by an objective lens having a numerical aperture in the range of 0.84 to 0.86, and radiated through the light transmission layer 12 to the information signal layers L0 to Ln to record or reproduce information signals. For example, the information signal layers L0 to Ln have a recording capacity of 25 GB or more if the wavelength is 405 nm and the numerical aperture of the condenser lens is NA 0.85. The optical recording medium 10 having such a configuration may be, for example, a multilayer Blu-ray Disc (BD, registered trademark). Hereinafter, a surface 10S irradiated with laser light for recording or reproducing information signals on the information signal layers L0 to Ln is referred to as a light irradiation surface 10S.

Hereinafter, the substrate 11, the information signal layers L0 to Ln, the intermediate layers S1 to Sn, and the light transmission layer 12 constituting the optical recording medium 10 will be sequentially described.

(Substrate)

The substrate 11 has, for example, a disk shape including a center hole in the center. One main surface of the substrate 11 is, for example, an uneven surface, and the information signal layer L0 is deposited on the uneven surface. Hereinafter, a recessed part of the uneven surface is referred to as an in-groove Gin, and a projecting part of the uneven surface is referred to as an on-groove Gon.

Examples of the shapes of the in-groove Gin and the on-groove Gon include a spiral shape, a concentric circular shape, and various other shapes. In addition, the in-groove Gin and/or the on-groove Gon are wobbled (meandering) for stabilizing the linear velocity and adding address information, for example.

The diameter of the substrate 11 is, for example, 120 mm. The thickness of the substrate 11 is selected in consideration of rigidity, preferably in the range of 0.3 to 1.3 mm, and more preferably in the range of 0.6 to 1.3 mm. For example, the thickness of the substrate 11 is 1.1 mm. In addition, the diameter of the center hole is, for example, 15 mm.

A material of the substrate 11 can be, for example, a plastic material or glass, and preferably a plastic material from the viewpoint of cost. Examples of plastic materials can include polycarbonate-based resins, polyolefin-based resins, acrylic-based resins, and the like.

(Information Signal Layer)

The information signal layers L1 to Ln are transmissive information signal layers each configured to be capable of transmitting laser light for recording or reproducing information signals so that recording or reproduction can be performed on the information signal layers L0 to Ln−1 located inside the light irradiation surface C.

Figure 2:
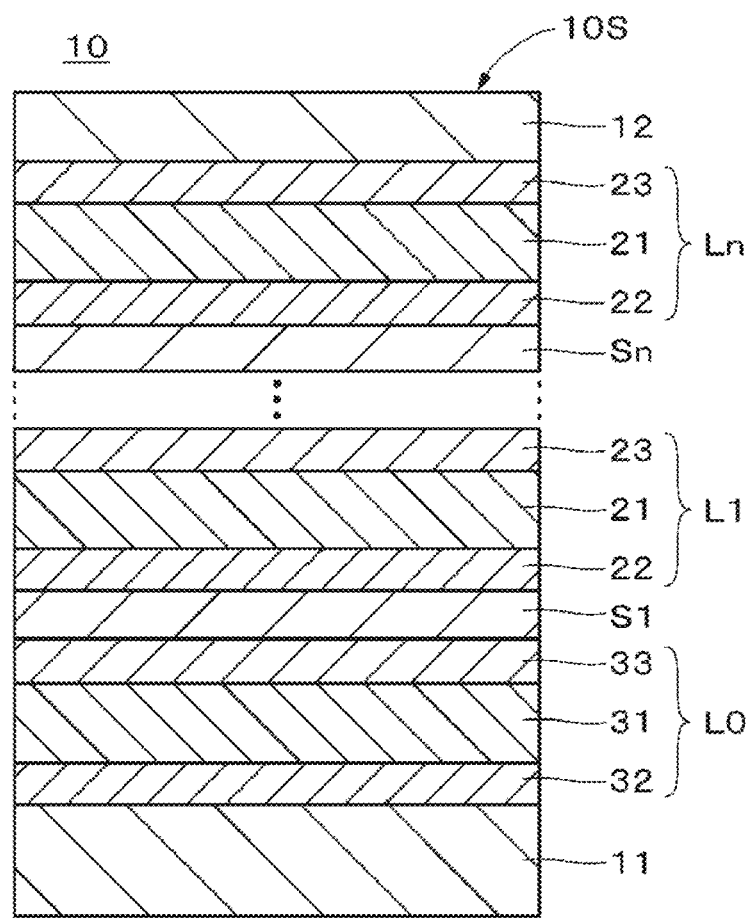
FIG. 2 is a schematic diagram illustrating an exemplary configuration of each information signal layer.

As illustrated in FIG. 2, the information signal layers L1 to Ln are each provided with a recording layer 21 having an upper surface (a first main surface) and a lower surface (a second main surface), a first dielectric layer 22 provided adjacent to the lower surface of the recording layer 21, and a second dielectric layer 23 provided adjacent to the upper surface of the recording layer 21. With such a configuration, the storage reliability of the information signal layers L0 to Ln can be improved. As used herein, the upper surface refers to one of the main surfaces of the recording layer 21 that is irradiated with laser light for recording or reproducing information signals, and the lower surface refers to the main surface opposite to the main surface that is irradiated with laser light, that is, the main surface on the substrate side.

The recording layer 21 mainly contains an inorganic recording material containing metal oxide. The inorganic recording material is, for example, an inorganic recording material containing manganese oxide (MnO-based material), an inorganic recording material containing palladium oxide (PdO-based material), an inorganic recording material containing copper oxide (CuO-based material), or an inorganic recording material containing silver oxide (AgO-based material).

In addition to manganese oxide, the MnO-based material preferably further contains one or both of tungsten oxide and molybdenum oxide and zirconium oxide. The MnO-based material may further contain one or both of nickel oxide and magnesium oxide together with or separately from these oxides other than manganese oxide.

In addition to palladium oxide, the PdO-based material preferably further contains tungsten oxide and copper oxide, and more preferably further contains tungsten oxide, copper oxide, and zinc oxide.

Since the first and second dielectric layers 22 and 23 function as gas barrier layers, the durability of the recording layer 21 can be improved. In addition, by suppressing the escape of oxygen from and the invasion of $H_2O$ into the recording layer 21, it is possible to suppress the change in the film quality of the recording layer 21 and ensure the film quality of the recording layer 21.

The first and second dielectric layers 22 and 23 contain a mixture of indium oxide and tin oxide (hereinafter referred to as "ITO"). The atomic concentration of tin in the first dielectric layer 22 provided on the lower surface of the recording layer 21 is higher than the atomic concentration of tin in the second dielectric layer 23 provided on the upper surface of the recording layer 21. The difference between the atomic concentration of tin in the first dielectric layer 23 and the atomic concentration of tin in the second dielectric layer 23 is, for example, greater than 0 atomic % and not greater than 1 atomic %, and preferably greater than 0 atomic % and not greater than 0.5 atomic %. More specifically, the atomic concentration of tin in the first dielectric layer 22 in the vicinity of the interface on the lower surface side of the recording layer 21 is higher than the atomic concentration of tin in the second dielectric layer 23 in the vicinity of the interface on the upper surface side of the recording layer 21. The difference between the atomic concentration of tin in the first dielectric layer 22 in the vicinity of the interface on the lower surface side of the recording layer 21 and the atomic concentration of tin in the second dielectric layer 23 in the vicinity of the interface on the upper surface side of the recording layer 21 is, for example, greater than 0 atomic % and not greater than 1 atomic %, and preferably greater than 0 atomic % and not greater than 0.5 atomic %.

The information signal layer L0 farthest from the light irradiation surface C includes a recording layer 31, a first dielectric layer 32 provided adjacent to the lower surface of the recording layer 31, and a second dielectric layer 33 provided adjacent to the upper surface of the recording layer 31.

The recording layer 31 mainly contains an inorganic recording material containing metal oxide. A material similar to that of the recording layer 21 can be used as this inorganic recording material. The function of the first and second dielectric layers 32 and 33 is similar to that of the first and second dielectric layers 22 and 23. Like the first and second dielectric layers 22 and 23, the first and second dielectric layers 32 and 33 may contain ITO or contain a dielectric material other than ITO.

(Intermediate Layer)

The intermediate layers S1 to Sn serve to separate the information signal layers L0 to Ln by a physically and optically sufficient distance, and uneven surfaces are provided on the surfaces thereof. Each of the uneven surfaces includes, for example, concentric or spiral grooves (in-groove Gin and on-groove Gon). The thickness of the intermediate layers S1 to Sn is preferably set in the range of 9 to 50 μm. Materials of the intermediate layers S1 to Sn are not particularly limited, but it is preferable to use an ultraviolet curable acrylic resin. In addition, since the intermediate layers S1 to Sn serve as optical paths for laser light for recording or reproducing information signals to and from the inner layers, it is preferable that the intermediate layers S1 to Sn have sufficiently high light transmittance.

(Light Transmission Layer)

The light transmission layer 12 is a resin layer obtained by curing a photosensitive resin such as an ultraviolet curable resin, for example. A material of this resin layer may be, for example, an ultraviolet curable acrylic-based resin. In addition, the light transmission layer 12 may include a light transmissive sheet having an annular shape and an adhesive layer for bonding the light transmissive sheet to the substrate 11. The light transmissive sheet preferably includes a material having a low absorbing ability with respect to laser light for recording and reproduction. Specifically, the light transmissive sheet preferably includes a material having a transmittance of 90% or more. A material of the light transmissive sheet can be, for example, a polycarbonate resin material, a polyolefin-based resin (for example, ZEONEX (registered trademark)), or the like. A material of the adhesive layer can be, for example, an ultraviolet curable resin, a pressure sensitive adhesive (PSA), or the like.

The thickness of the light transmission layer 12 is preferably selected from the range of 10 to 177 μm. For example, the thickness of the light transmission layer 12 is 100 μm. High-density recording can be realized by combining such a thin light transmission layer 12 with an objective lens having a high numerical aperture (NA) of, for example, about 0.85.

(Hard Coat Layer)

Note that a hard coat layer (not illustrated) may further be provided on the surface (light irradiation surface 10S) of the light transmission layer 12 so as to provide protection against mechanical shock and scratches and to protect the quality of recording and reproducing information signals against adhesion of dust and fingerprints during use. The hard coat layer may include an ultraviolet curable resin containing fine powder of silica gel in order to improve the mechanical strength, or may include solvent type or solventless type ultraviolet curable resin. In order to ensure that the hard coat layer is mechanically strong and has water repellency and oil repellency, the thickness of the hard coat layer is preferably in the range of one to several micrometers.

[2 Method for Manufacturing Optical Recording Medium]

Next, an example of a method for manufacturing an optical recording medium according to an embodiment of the present technology will be described.

(Step of Molding Substrate)

First, the substrate 11 having an uneven surface on one main surface is molded. Examples of methods for molding the substrate 11 include an injection molding method, a photopolymer method (2P method: Photo Polymerization), and the like.

(Step of Forming Information Signal Layer L0)

Next, the information signal layer L0 is formed by sequentially stacking the first dielectric layer 32, the recording layer 31, and the second dielectric layer 33 on the substrate 11 using, for example, a sputtering method.

(Step of Forming Intermediate Layer)

Next, an ultraviolet curable resin is uniformly applied on the information signal layer L0 using, for example, a spin coating method. Thereafter, an uneven pattern of a stamper is pressed against the ultraviolet curable resin uniformly applied on the information signal layer L0. The ultraviolet curable resin is then irradiated and cured with ultraviolet rays, and the stamper is peeled off. As a result, the uneven pattern of the stamper is transferred to the ultraviolet curable resin, and the intermediate layer S1 provided with the in-groove Gin and the on-groove Gon, for example, is formed on the information signal layer L0.

(Step of Forming Information Signal Layer L1)

Next, the information signal layer L1 is formed by sequentially stacking the first dielectric layer 22, the recording layer 21, and the second dielectric layer 23 on the intermediate layer S1 using, for example, the sputtering method. Hereinafter, the step of forming each layer of the information signal layer L1 will be described in detail.

First, the substrate 11 is conveyed into a vacuum chamber provided with a target containing ITO, and the vacuum chamber is evacuated until the inner pressure reaches a predetermined pressure. Thereafter, while introducing Ar gas and O₂ gas as process gases into the vacuum chamber, the target is sputtered to deposit the first dielectric layer 22 on the substrate 11.

Next, the substrate 11 is conveyed into a vacuum chamber provided with a target for depositing a recording layer, and the vacuum chamber is evacuated until the inner pressure reaches a predetermined pressure. Thereafter, while introducing a process gas such as Ar gas or O₂ gas into the vacuum chamber, the target is sputtered to deposit the recording layer 21 on the first dielectric layer 22.

Next, the substrate 11 is conveyed into a vacuum chamber provided with a target containing ITO, and the vacuum chamber is evacuated until the inner pressure reaches a predetermined pressure. Thereafter, while introducing Ar gas as a process gas into the vacuum chamber, the target is sputtered to deposit the second dielectric layer 23 on the recording layer 21. Note that the targets used for depositing the first and second dielectric layers 22 and 23 have the same composition.

As described above, the atomic concentration of tin in the first dielectric layer 22 deposited by sputtering the target while introducing Ar gas and O₂ gas is higher than that in the second dielectric layer 23 deposited by sputtering the target without introducing O₂ gas.

(Step of Forming Intermediate Layer)

Next, an ultraviolet curable resin is uniformly applied on the information signal layer L1 using, for example, the spin coating method. Thereafter, an uneven pattern of a stamper is pressed against the ultraviolet curable resin uniformly applied on the information signal layer L1. The ultraviolet curable resin is then irradiated and cured with ultraviolet rays, and the stamper is peeled off. As a result, the uneven pattern of the stamper is transferred to the ultraviolet curable resin, and the intermediate layer S2 provided with the in-groove Gin and the on-groove Gon, for example, is formed on the information signal layer L1.

(Step of Forming Information Signal Layers L2 to Ln and Intermediate Layers S3 to Sn)

Next, in a way similar to that for the above-mentioned steps of forming the information signal layer L1 and the intermediate layer S2, the information signal layer L2, the intermediate layer S2, the information signal layer L3, . . . , the intermediate layer Sn, and the information signal layer Ln are stacked on the intermediate layer S2 in this order.

(Step of Forming Light Transmission Layer)

Next, the information signal layer Ln is spin-coated with a photosensitive resin such as an ultraviolet curable resin (UV resin) using, for example, the spin coating method, and then the photosensitive resin is irradiated and cured with light such as ultraviolet rays. Consequently, the light transmission layer 12 is formed on the information signal layer Ln.

Through the above steps, the target optical recording medium 10 is obtained.

[3 Effect]

The optical recording medium 10 according to the present embodiment includes the plurality of information signal layers L0 to Ln. The information signal layers L1 to Ln of the plurality of information signal layers L0 to Ln other than the farthest information signal layer from the light irradiation surface 10S each include the recording layer 21, the first dielectric layer 22 provided on the lower surface side of the recording layer 21, and the second dielectric layer 23 provided on the upper surface side of the recording layer 21. The first dielectric layer 22 and the second dielectric layer 23 contain indium oxide and tin oxide, and the atomic concentration of tin in the first dielectric layer 22 is higher than the atomic concentration of tin in the second dielectric layer 23. Consequently, the transmittance of the information signal layers L1 to Ln can be improved, and fluctuations in transmittance before and after recording can be suppressed.

[4 Modification]

Figure 3:
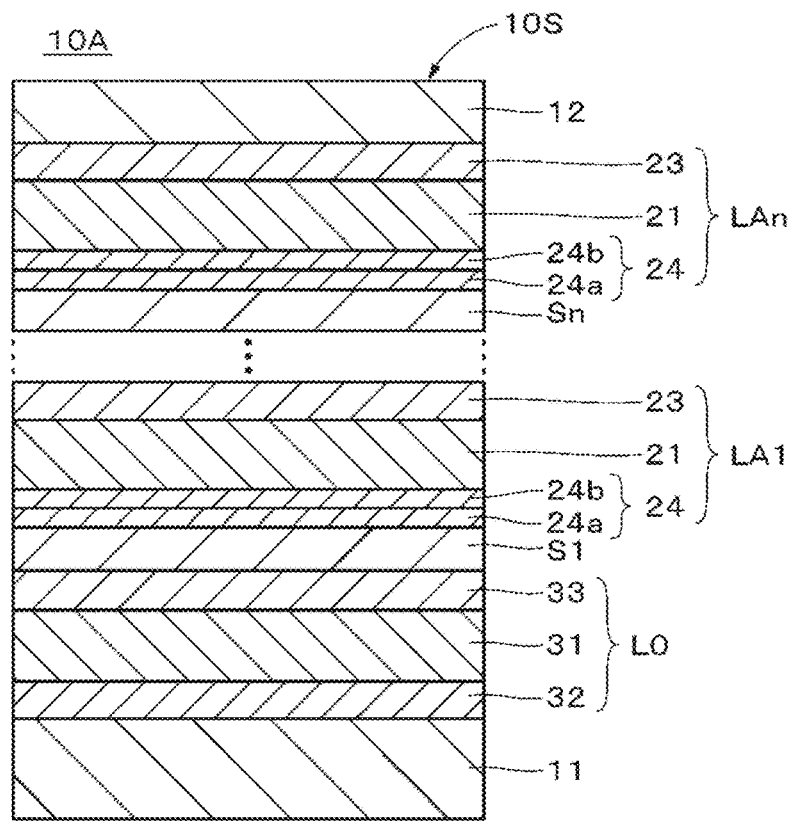
FIG. 3 is a schematic diagram illustrating an exemplary configuration of an optical recording medium according to a modification of the embodiment of the present technology.
Figure 4:
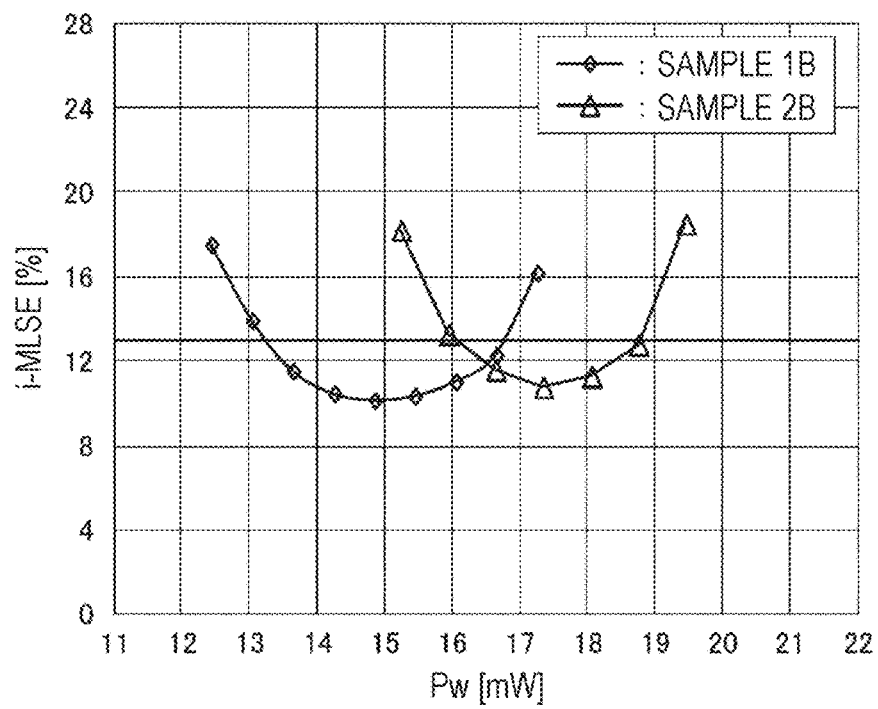
FIG. 4 is a graph illustrating the recording power dependence of i-MLSE of Samples 1B and 2B.
Figure 5:
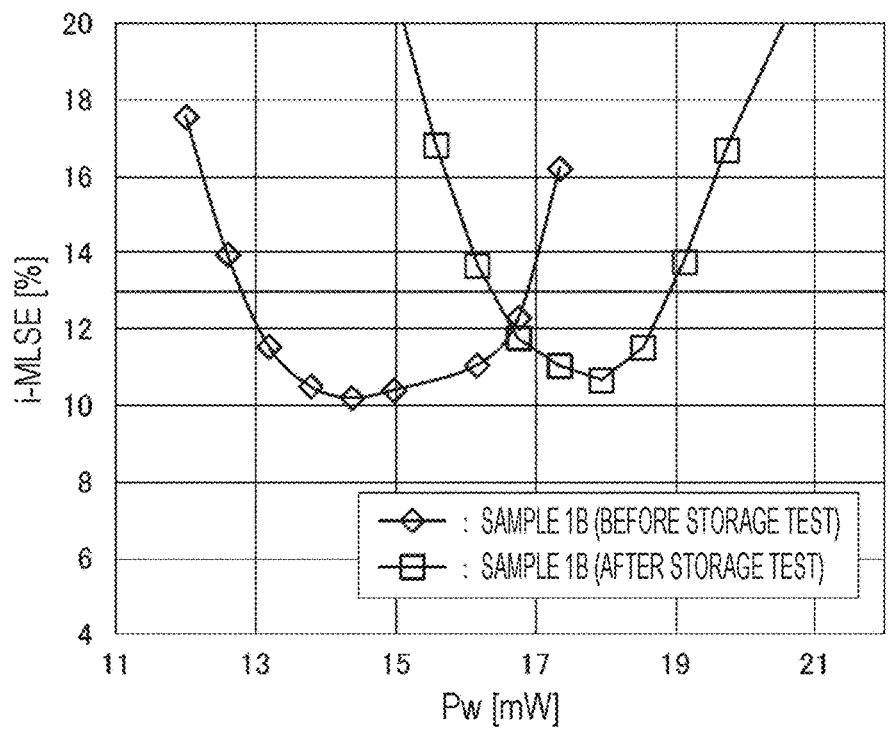
FIG. 5A is a graph illustrating the recording power dependence of i-MLSE of Sample 1B before and after a storage test.
FIG. 5B is a graph illustrating the recording power dependence of i-MLSE of Sample 2B before and after a storage test.
Figure 5:
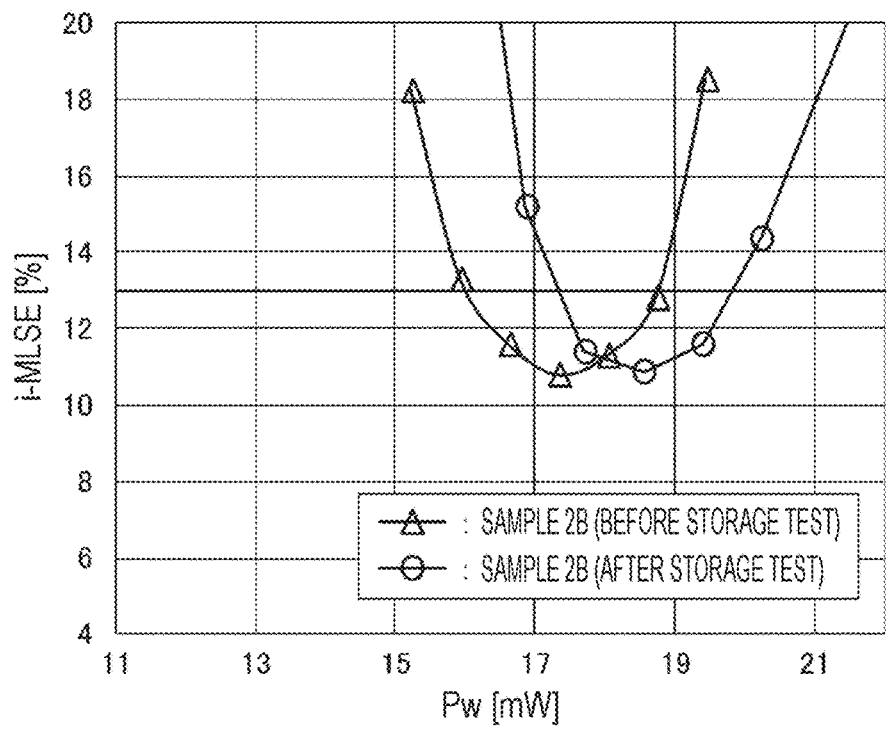
Figure 6:
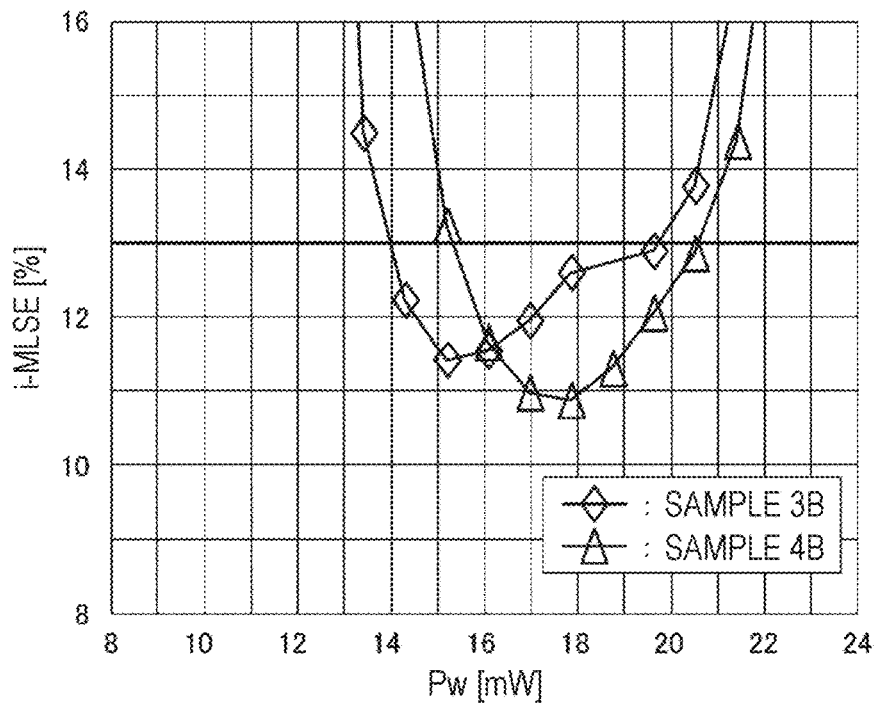
FIG. 6 is a graph illustrating the recording power dependence of i-MLSE of Samples 3B and 4B.
Figure 7:
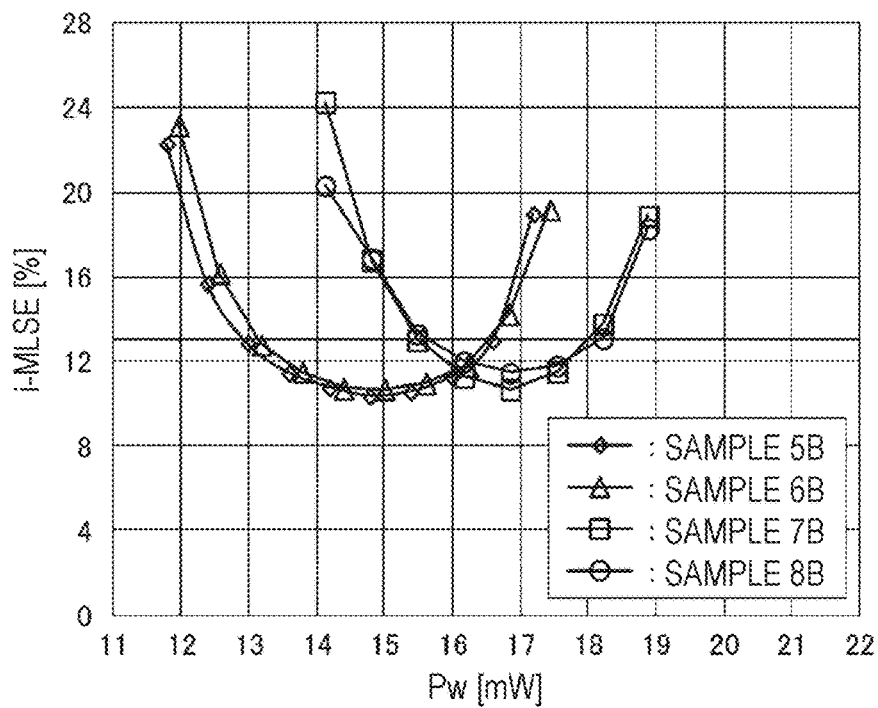
FIG. 7 is a graph illustrating the recording power dependence of i-MLSE of Samples 5B, 6B, 7B, and 8B.

As illustrated in FIG. 3, in an optical recording medium 10A according to a modification of the embodiment, information signal layers LA1 to LAn each include a first dielectric layer 24 having a two-layer structure instead of the first dielectric layer 22 having a single-layer structure. The first dielectric layer 24 includes a lower dielectric layer (first layer) 24a and an upper dielectric layer (second layer) 24b. The lower dielectric layer 24a is provided on the side of the intermediate layers S1, S2, . . . , and Sn opposite to the lower surface of the recording layer 21, and the upper dielectric layer 24b is provided on the lower surface side of the recording layer 21.

The lower dielectric layer 24a and the upper dielectric layer 24b contain ITO. The atomic concentration of tin in the upper dielectric layer 24b is higher than the atomic concentration of tin in the lower dielectric layer 24a. The difference between the atomic concentration of tin in the upper dielectric layer 24b and the atomic concentration of tin in the lower dielectric layer 24a is, for example, greater than 0 atomic % and not greater than 1 atomic %, and preferably greater than 0 atomic % and not greater than 0.5 atomic %. In addition, the atomic concentration of tin in the upper dielectric layer 24b is higher than the atomic concentration of tin in the second dielectric layer 23. More specifically, the atomic concentration of tin in the upper dielectric layer 24b in the vicinity of the interface on the lower surface side of the recording layer 21 is higher than the atomic concentration of tin in the second dielectric layer 23 in the vicinity of the interface on the upper surface side of the recording layer 21. The difference between the atomic concentration of tin in the upper dielectric layer 24b in the vicinity of the interface on the lower surface side of the recording layer 21 and the atomic concentration of tin in the second dielectric layer 23 in the vicinity of the interface on the upper surface side of the recording layer 21 is, for example, greater than 0 atomic % and not greater than 1 atomic %, and preferably greater than 0 atomic % and not greater than 0.5 atomic %. The atomic concentration of tin in the lower dielectric layer 24a may be the same as or different from the atomic concentration of tin in the second dielectric layer 23.

The upper dielectric layer 24b is obtained by sputtering a target containing ITO while introducing Ar gas and O₂ gas. On the other hand, the lower dielectric layer 24a is obtained by sputtering a target containing ITO while introducing Ar gas. Here, the targets used for depositing the lower dielectric layer 24a and the upper dielectric layer 24b have the same composition.

The power margin of the optical recording medium 10A having the above-described configuration is better than that of the optical recording medium 10 according to the embodiment.

Note that instead of the first dielectric layer 24 having a two-layer structure with different degrees of atomic concentration of tin, a single-layer first dielectric layer in which the atomic concentration distribution of tin changes in the thickness direction may be provided. In this case, in the first dielectric layer, the atomic concentration distribution of tin in the vicinity of the interface on the lower surface side of the recording layer 21 is higher than the atomic concentration distribution in the vicinity of the interface opposite to the lower surface of the recording layer 21 (that is, the side of the intermediate layers S1, S2, . . . , and Sn). The first dielectric layer may be an inclined film that is inclined so that the atomic concentration of tin decreases from the interface on the lower surface side of the recording layer 21 toward the opposite interface.

In the configuration described in the above embodiment, the first and second dielectric layers 22 and 23 in all the information signal layers L1 to Ln contain ITO and have different degrees of tin concentration. However, the first and second dielectric layers 22 and 23 in some of the information signal layers L1 to Ln may have different degrees of tin concentration, and the first and second dielectric layers 22 and 23 in the remaining layers may not have different degrees of tin concentration.

In the configuration described in the above embodiment, the first and second dielectric layers 22 and 23 in all the information signal layers L1 to Ln contain ITO. However, the first and second dielectric layers 22 and 23 in some of the information signal layers L1 to Ln may contain ITO, and the first and second dielectric layers 22 and 23 in the remaining layers may contain a dielectric material other than ITO.

In the layer configuration described in the example of the above embodiment, all of the plurality of information signal layers L1 to Ln include a recording layer and dielectric layers provided on both surfaces of the recording layer. However, the layer configuration is not limited thereto. At least one of the plurality of information signal layer information signal layers L1 to Ln may have a layer configuration including a recording layer and dielectric layers provided on both surfaces of the recording layer, and the remaining layers may have a different layer configuration. However, from the viewpoint of productivity, it is preferable that all the information signal layers have the same layer configuration.

In the example described in the above embodiment, the present technology is applied to the optical recording medium including the plurality of information signal layers L0 to Ln and the light transmission layer 12 stacked in this order on the substrate 11 such that laser light is radiated through the light transmission layer 12 to the plurality of information signal layers L0 to Ln to record or reproduce information signals. However, the present technology is not limited to this example. For example, the present technology can also be applied to an optical recording medium including a plurality of information signal layers and a protective layer stacked in this order on a substrate such that laser light is radiated through the substrate to the plurality of information signal layers to record or reproduce information signals, an optical recording medium including a plurality of information signal layers between two substrates such that laser light is radiated through at least one of the substrates to the plurality of information signal layers to record or reproduce information signals, or an optical recording medium in which two disks including a plurality of information signal layers are bonded together such that laser light is radiated through the surface of each disk to the plurality of information signal layers included in each disk to record or reproduce information signals.

EXAMPLES

Hereinafter, the present technology will be described in detail by way of examples, but the present technology is not limited to only these examples.

Examples of the present technology will be described in the following order.

i Improvement of Transmittance and Suppression of Transmittance Change (MnO-Based Recording Layer)

ii Improvement of Transmittance and Suppression of Transmittance Change (PdO-Based Recording Layer)

iii Improvement of Power Margin

<i Improvement of Transmittance and Suppression of Transmittance Change (MnO-Based Recording Layer)>

[Sample 1A]

First, a polycarbonate substrate with a thickness of 1.1 mm was molded by injection molding. Note that an uneven surface having in-grooves and on-grooves was formed on the polycarbonate substrate. Next, a first information signal layer was formed by sequentially stacking a first dielectric layer, a recording layer, and a second dielectric layer on the uneven surface of the polycarbonate substrate using the sputtering method.

The configuration and film forming conditions of the first information signal layer are described below.

First dielectric layer (substrate side)

Material: ITO

Thickness: 18 nm

Film forming conditions: A film was formed by sputtering an ITO target under an Ar gas atmosphere.

Recording layer

Material: MnO

Thickness: 30 nm

Film forming conditions: A film was formed by sputtering a Mn target under a mixed gas atmosphere of Ar gas and $O_2$ gas.

Second dielectric layer (light transmission layer side)

Material: ITO

Thickness: 18 nm

Film forming conditions: A film was formed by sputtering an ITO target under an Ar gas atmosphere.

Note that the ITO targets used for depositing the first and second dielectric layers had the same composition.

Next, an ultraviolet curable resin was uniformly applied on the first information signal layer using the spin coating method, and the ultraviolet curable resin was irradiated and cured with ultraviolet rays to form a light transmission layer having a thickness of 100 μm.

Thus, a target optical recording medium was obtained.

[Sample 1B]

First, as in the case of Sample 1A, a first information signal layer was formed on the uneven surface of a polycarbonate substrate. Next, an ultraviolet curable resin was uniformly applied on the first information signal layer using the spin coating method. Thereafter, an uneven pattern of a stamper was pressed against the ultraviolet curable resin uniformly applied on the first information signal layer. The ultraviolet curable resin was then irradiated and cured with ultraviolet rays, and the stamper was peeled off. As a result, an intermediate layer including in-grooves and on-grooves and having a thickness of 15 μm was formed.

Next, a second information signal layer was formed by sequentially stacking a first dielectric layer, a recording layer, and a second dielectric layer on the intermediate layer. The configuration of the second information signal layer was similar to that of the first information signal layer.

Next, an ultraviolet curable resin was uniformly applied on the second information signal layer using the spin coating method, and the ultraviolet curable resin was irradiated and cured with ultraviolet rays to form a light transmission layer having a thickness of 85 μm.

Thus, a target optical recording medium was obtained.

[Sample 2A]

An optical recording medium was obtained in a manner similar to that for Example 1A except that a first dielectric layer of a first information signal layer was deposited by sputtering an ITO target in a mixed gas atmosphere of Ar gas and $O_2$ gas.

[Sample 2B]

optical recording medium was obtained in a manner similar to that for Example 1A except that first dielectric layers of a first information signal layer and a second information signal layer were deposited by sputtering ITO targets in a mixed gas atmosphere of Ar gas and $O_2$ gas.

[Evaluation]

Using the samples obtained as described above, the following evaluation was made. Note that in the present examples, ODU-1000 (trade name) manufactured by Pulstec Corporation was used as a disk tester.

(Transmittance)

The transmittance T1 of the second information signal layer of Sample 1B was obtained as follows. First, the reflectance R0 of the first information signal layer of Sample 1A was measured with the disk tester. Next, the reflectance R10 of the first information signal layer of Sample 1B was measured with the disk tester. Next, the transmittance T1 of the second information signal layer of Sample 1B was obtained using the following formula.

$$T1=\sqrt{(R10/R0)} \times 100 [\%]$$

Here, "$\sqrt{(R10/R0)}$" means the square root of (R10/R0).

The transmittance T1 of the second information signal layer of Sample 2B was obtained in a manner similar to that for the transmittance T1 of the second information signal layer of Sample 1B.

(Transmittance Change Rate)

The transmittance change rate TCR of the second information signal layer of Sample 1B was obtained as follows. First, as in the case of the evaluation of the transmittance described above, the reflectance R0 of the first information signal layer of Sample 1A and the transmittance T1 of the second information signal layer of Sample 1B were obtained. Next, recording was performed on the second information signal layer of Sample 1B with the disk tester. Note that the recording conditions were similar to those for the evaluation of the power margin described later. In addition, the recording power was set to the optimum recording power Pwo.

Next, the reflectance R10' of the first information signal layer right under the area where recording was performed on the second information signal layer was measured with the disk tester. Next, the transmittance T1' of the second information signal layer of Sample 1B was obtained using the following formula.

$$T1'=\sqrt{(R10'/R0)} \times 100 [\%]$$

Here, "$\sqrt{(R10'/R0)}$" means the square root of (R10'/R0).

Next, the transmittance change rate TCR of the second information signal layer of Sample 1B before and after recording was calculated using the following formula.

$$TCR=((T1'/T1)-1) \times 100 [\%]$$

The transmittance change rate TCR of the second information signal layer of Sample 2B was obtained in a manner similar to that for the transmittance change rate TCR of the second information signal layer of Sample 1B.

(Optimum Recording Power and Power Margin Before Storage Test)

Before the storage test, the optimum recording power and power margin of the second information signal layer of each of Samples 1B and 2B were evaluated as follows. First, 1-7 modulated data with a density of 32 GB per layer were recorded with the disk tester at a numerical aperture (NA) of 0.85, a recording wavelength ($\lambda$) of 405 nm, and a recording linear velocity (v) of 15.38 m/s (corresponding to quadruple speed). After that, the integrated maximum likelihood sequenced error (i-MLSE) of the recording part was measured at a recording linear velocity (v) of 7.69 m/s (corresponding to double speed). At this time, i-MLSE was measured by changing recording power. Next, the power margin Pw Mgn was obtained using the following formula, assuming that the lower limit value of recording power where i-MLSE is less than 13% is Pwd and the upper limit value is Pwu.

$$Pw\ Mgn=((Pwu-Pwd)/(Pwu+Pwd)) \times 100 [\%]$$

In addition, the optimum recording power Pwo was obtained using the following formula.

$$Pwo=(Pwd+Pwu)/2$$

(Optimum Recording Power and Power Margin after Storage Test)

After the storage test, the optimum recording power and power margin of the second information signal layer of each of Samples 1B and 2B were evaluated as follows. First, Samples 1B and 2B were stored at 80° C. under 85% RH for 200 hours, and Samples 1B and 2B were returned to room temperature. Thereafter, in a manner similar to that for the evaluation of the optimum recording power and the power margin before the storage test, the optimum recording power and the power margin were obtained.

In addition, the optimum recording power Pwo ratio and the power margin ratio before and after the storage test were obtained using the following formula.

Pwo ratio=(optimum recording power after storage test)/(optimum recording power before storage test)

Power margin ratio=(power margin after storage test)/(power margin before storage test)

(Composition Analysis)

First, by omitting the step of forming a light transmission layer, Samples 1B and 2B were prepared as samples for composition analysis, with the upper surface of the second information signal layer exposed. Next, Samples 1B and 2B were sputtered under the following conditions, X-ray fluorescence analysis (XRF) was performed in the depth direction from the surface of the first information signal layer, and the atomic concentration distribution of indium, tin, and oxygen in the thickness (depth) direction of the second dielectric layer was obtained.

<Sputtering Conditions>

Acceleration voltage: 1 kV

Sputtering rate: 1.4 nm/min (in terms of $SiO_2$)

The result of the above composition analysis showed that there was hardly any difference in the atomic concentration distribution of indium and oxygen, whereas there was a clear difference in the atomic concentration distribution of tin. That is, it was confirmed that the atomic concentration of the first dielectric layer of Sample 2B was higher than the atomic concentration of the first dielectric layer of Sample 1B. The difference between the atomic concentration of the first dielectric layer of Sample 2B in the vicinity of the interface on the lower surface side of the recording layer and the atomic concentration of the first dielectric layer of Sample 1B was 0.3 atomic %.

Tables 1 and 2 show the evaluation results of Samples 2A and 2B.

TABLE 1

| | INTRODUCED GAS (FIRST DIELECTRIC LAYER) | TRANSMITTANCE [%] | TRANSMITTANCE CHANGE RATE [%] | ATOMIC CONCENTRATION OF Sn [atomic %] |
|---|---|---|---|---|
| SAMPLE 1B | Ar | 68.2 | 5.9 | 2.9 |
| SAMPLE 2B | Ar + $O_2$ | 71.3 | 4.0 | 3.2 |

TABLE 2

| | BEFORE STORAGE TEST | | AFTER STORAGE TEST | | Pw | |
|---|---|---|---|---|---|---|
| | Pwo [mW] | Pw Margin [%] | Pwo [mW] | Pw Margin [%] | Pwo RATIO | Margin RATIO |
| SAMPLE 1B | 15.0 | 25.7 | 17.7 | 14.1 | 1.18 | 0.55 |
| SAMPLE 2B | 17.4 | 15.9 | 18.6 | 13.2 | 1.07 | 0.83 |

Table 1 and Table 2 indicate the following.

The transmittance of the second information signal layer of Sample 2B is higher than the transmittance of the second information signal layer of Sample 1B. In addition, the transmittance change rate of the second information signal layer of Sample 2B is lower than the transmittance change rate of the second information signal layer of Sample 1B.

On the other hand, the power margin of the second information signal layer of Sample 2B is narrower than the power margin of the second information signal layer of Sample 1B. However, the power margin of the second information signal layer of Sample 2B is still within a range sufficiently acceptable for optical recording media used in existing consumer drives.

Therefore, by making the atomic concentration of tin in the first dielectric layer on the lower surface side of the recording layer higher than the atomic concentration of tin in the second dielectric layer on the upper surface side of the recording layer, the transmittance of the second information signal layer can be improved, and the transmittance change of the second information signal layer before and after recording can be suppressed.

In addition, the result of the above composition analysis shows that the atomic concentration of tin in the first dielectric layer deposited by sputtering an ITO target while introducing oxygen can be slightly higher than the atomic concentration of tin in the first dielectric layer deposited by sputtering an ITO target without introducing oxygen.

<ii Improvement of Transmittance and Suppression of Transmittance Change (PdO-Based Recording Layer)>

[Sample 3A]

An optical recording medium was obtained in a manner similar to that for Example 1A, except that the configuration and film forming conditions of a first information signal layer were changed as follows.

Material: ITO
Thickness: 8 nm
Film forming conditions: A film was formed by sputtering an ITO target under an Ar gas atmosphere.
Recording layer
Material: Pd—W—Zn—Cu—O
Thickness: 30 nm
Film forming conditions: A film was formed by co-sputtering a Pd target, a W target, a Zn target, and a Cu target in a mixed gas atmosphere of Ar gas and $O_2$ gas.

Second dielectric layer (light transmission layer side)
Material: ITO
Thickness: 20 nm
Film forming conditions: A film was formed by sputtering an ITO target under an Ar gas atmosphere.

[Sample 3B]

A first information signal layer and a second information signal layer were formed under the configuration and film forming conditions similar to those of the first information signal layer of Sample 3A. Except for this, the method of obtaining an optical recording medium was similar to that for Example 1B.

[Sample 4A]

An optical recording medium was obtained in a manner similar to that for Example 3A except that a first dielectric layer of a first information signal layer was deposited by sputtering an ITO target in a mixed gas atmosphere of Ar gas and $O_2$ gas.

[Sample 4B]

An optical recording medium was obtained in a manner similar to that for Example 3B except that first dielectric layers of a first information signal layer and a second information signal layer were deposited by sputtering ITO targets in a mixed gas atmosphere of Ar gas and $O_2$ gas.

[Evaluation]

Using the samples obtained as described above, the transmittance, the transmittance change rate, and the power margin were evaluated in a manner similar to the above-described manner.

Table 3 shows the evaluation results of Sample 3B and Sample 4B.

TABLE 3

| | INTRODUCED GAS (FIRST DIELECTRIC LAYER) | TRANSMITTANCE [%] | TRANSMITTANCE CHANGE RATE [%] | Pw Margin [%] |
|---|---|---|---|---|
| SAMPLE 3B | Ar | 53.5 | 2.7 | 34.1 |
| SAMPLE 4B | Ar + $O_2$ | 56.5 | 2.3 | 29.4 |

Table 3 indicates the following.

Even in a case where a PdO-based recording layer is used as a recording layer, by making the atomic concentration of tin in the first dielectric layer on the lower surface side of the recording layer higher than the atomic concentration of tin in the second dielectric layer on the upper surface side of the recording layer, effects similar to those of the MnO-based recording layer can be obtained. That is, the transmittance of the second information signal layer can be improved, and the transmittance change of the second information signal layer before and after recording can be suppressed.

<iii Improvement of Power Margin>

[Sample 5A]

An optical recording medium was obtained in a manner similar to that for Sample 1A except that a first dielectric layer having a two-layer structure was deposited as the first dielectric layer of the first information signal layer.

The configuration and film forming conditions of the first dielectric layer having a two-layer structure are described below.

Lower dielectric layer (substrate side)
Material: ITO
Thickness: 9 nm
Film forming conditions: A film was formed by sputtering an ITO target under an Ar gas atmosphere.

Upper dielectric layer (light transmission layer side)
Material: ITO
Thickness: 9 nm
Film forming conditions: A film was formed by sputtering an ITO target under an Ar gas atmosphere.

[Sample 5B]

A first information signal layer and a second information signal layer were formed under the configuration and film forming conditions similar to those of the first information signal layer of Sample 5A. Except for this, the method of obtaining an optical recording medium was similar to that for Example 1B.

[Sample 6A]

An optical recording medium was obtained in a manner similar to that for Sample 5A except that an upper dielectric layer of a first information signal layer was deposited by sputtering an ITO target in a mixed gas atmosphere of Ar gas and $O_2$ gas.

Using the samples obtained as described above, the transmittance, the transmittance change rate, and the power margin were evaluated in a manner similar to the above-described manner. In addition, these values were evaluated according to the following criteria.

<Power Margin>
○: 25% or more, Δ: 15% or more and less than 25%, x: less than 15%
<Transmittance>
○: 70% or more, Δ: 67% or more and 70% or less, x: less than 67%
<Transmittance Change Rate>
○: 5% or less, Δ: more than 5% and 7% or less, x: more than 7%

Note that the above symbols "○", "Δ", and "x" respectively mean "good", "average", and "bad".

Table 4 shows the evaluation results of Samples 5B, 6B, 7B, and 8B.

TABLE 4

| | INTRODUCED GAS (LOWER DIELECTRIC LAYER) | INTRODUCED GAS (UPPER DIELECTRIC LAYER) | TRANSMITTANCE [%] | TRANSMITTANCE CHANGE RATE [%] | Pw Margin [%] | EVALUATION RESULT | | |
|---|---|---|---|---|---|---|---|---|
| | | | | | | TRANSMITTANCE | TRANSMITTANCE CHANGE RATE | Pw Margin |
| SAMPLE 5B | Ar | Ar | 68.2 | 5.9 | 26.2 | Δ | Δ | ○ |
| SAMPLE 6B | Ar | Ar + $O_2$ | 69.5 | 4.9 | 26.0 | ○ | ○ | ○ |
| SAMPLE 7B | Ar + $O_2$ | Ar | 71.5 | 3.9 | 15.9 | ○ | ○ | Δ |
| SAMPLE 8B | Ar + $O_2$ | Ar + $O_2$ | 71.3 | 4.0 | 15.9 | ○ | ○ | Δ |

[Sample 6B]

An optical recording medium was obtained in a manner similar to that for Sample 5B except that upper dielectric layers of a first information signal layer and a second information signal layer were deposited by sputtering ITO targets in a mixed gas atmosphere of Ar gas and $O_2$ gas.

[Sample 7A]

An optical recording medium was obtained in a manner similar to that for Sample 5A except that a lower dielectric layer of a first information signal layer was deposited by sputtering an ITO target in a mixed gas atmosphere of Ar gas and $O_2$ gas.

[Sample 7B]

An optical recording medium was obtained in a manner similar to that for Sample 5B except that lower dielectric layers of a first information signal layer and a second information signal layer were deposited by sputtering ITO targets in a mixed gas atmosphere of Ar gas and $O_2$ gas.

[Sample 8A]

An optical recording medium was obtained in a manner similar to that for Sample 5A except that an upper dielectric layer and a lower dielectric layer of a first information signal layer were deposited by sputtering ITO targets in a mixed gas atmosphere of Ar gas and $O_2$ gas.

[Sample 8B]

An optical recording medium was obtained in a manner similar to that for Sample 5B except that upper dielectric layers and lower dielectric layers of a first information signal layer and a second information signal layer were deposited by sputtering ITO targets in a mixed gas atmosphere of Ar gas and $O_2$ gas.

[Evaluation]

Table 4 indicates the following.

By producing the first dielectric layer having a two-layer structure, making the atomic concentration of tin in the upper dielectric layer higher than the atomic concentration in the lower dielectric layer, and making the atomic concentration of tin in the upper dielectric layer higher than the atomic concentration of tin in the second dielectric layer, the transmittance of the second information signal layer can be improved, and the power margin can be improved while the transmittance change of the second information signal layer before and after recording is suppressed.

Although the embodiment of the present technology and the modification and examples thereof have been described in detail above, the present technology is not limited to the above-described embodiment and examples but can be variously modified on the basis of the technical idea of the present technology.

For example, the configurations, methods, steps, shapes, materials, numerical values, and the like mentioned in the above embodiment and the modification and examples thereof are merely examples, and different configurations, methods, steps, shapes, materials, numerical values, and the like may be used.

In addition, the configurations, methods, steps, shapes, materials, numerical values, and the like of the above embodiment and the modification and examples thereof can be combined with each other as long as they do not deviate from the gist of the present technology.

In addition, the present technology can adopt the following configuration.

(1) An optical recording medium including a plurality of information signal layers, in which at least one of the plurality of information signal layers other than the farthest information signal layer from a light irradiation surface includes:

a recording layer;

a first dielectric layer provided on a side opposite to a light incident side of the recording layer; and a second dielectric layer provided on the light incident side of the recording layer, the first dielectric layer and the second dielectric layer include indium oxide and tin oxide, and an atomic concentration of tin in the first dielectric layer is higher than an atomic concentration of tin in the second dielectric layer.

(2) The optical recording medium according to (1), in which a difference between the atomic concentration of tin in the first dielectric layer and the atomic concentration of tin in the second dielectric layer is 0.5 atomic % or less.

(3) The optical recording medium according to (1), in which the atomic concentration of tin in the first dielectric layer is higher in the vicinity of an interface close to the recording layer than in the vicinity of an interface opposite to the recording layer.

(4) The optical recording medium according to (1), in which the first dielectric layer includes a first layer and a second layer, the second layer of the first layer and the second layer is provided on a light irradiation side of the first dielectric layer, and an atomic concentration of tin in the second layer is higher than the atomic concentration of tin in the second dielectric layer.

(5) The optical recording medium according to (4), in which a difference between a content of tin in the second dielectric layer and a content of tin in the second layer is 0.5 atomic % or less.

(6) The optical recording medium according to (4) or (5), in which the atomic concentration of tin in the second layer is higher than an atomic concentration of tin in the first layer.

(7) The optical recording medium according to any of (1) to (6), in which the recording layer contains manganese oxide.

(8) An optical recording medium including a plurality of information signal layers, in which at least one of the plurality of information signal layers other than the farthest information signal layer from a light irradiation surface includes:

a recording layer;

a first dielectric layer provided on a side opposite to a light incident side of the recording layer; and a second dielectric layer provided on the light incident side of the recording layer, the first dielectric layer and the second dielectric layer include indium oxide and tin oxide, and an atomic concentration of tin in the first dielectric layer in the vicinity of an interface on the light incident side is higher than an atomic concentration of tin in the second dielectric layer.

REFERENCE SIGNS LIST 10, 10A Optical recording medium
10S Light irradiation surface
11 Substrate
12 Light transmission layer
21 Recording layer
22, 24 First dielectric layer
23 Second dielectric layer
24a Lower dielectric layer
24b Upper dielectric layer
L0 to Ln, LA0 to LAn Information signal layer
S1 to Sn Intermediate layer
Gin In-groove
Gon On-groove

The invention claimed is:

1. An optical recording medium comprising a plurality of information signal layers, wherein at least one of the plurality of information signal layers other than the farthest information signal layer from a light irradiation surface includes:

a recording layer;

a first dielectric layer provided on a side opposite to a light incident side of the recording layer; and a second dielectric layer provided on the light incident side of the recording layer, the first dielectric layer and the second dielectric layer include indium oxide and tin oxide, and an atomic concentration of tin in the first dielectric layer is higher than an atomic concentration of tin in the second dielectric layer.

2. The optical recording medium according to claim 1, wherein a difference between the atomic concentration of tin in the first dielectric layer and the atomic concentration of tin in the second dielectric layer is 0.5 atomic % or less.

3. The optical recording medium according to claim 1, wherein the atomic concentration of tin in the first dielectric layer is higher in the vicinity of an interface close to the recording layer than in the vicinity of an interface opposite to the recording layer.

4. The optical recording medium according to claim 1, wherein the first dielectric layer includes a first layer and a second layer, the second layer of the first layer and the second layer is provided on a light irradiation side of the first dielectric layer, and an atomic concentration of tin in the second layer is higher than the atomic concentration of tin in the second dielectric layer.

5. The optical recording medium according to claim 4, wherein a difference between a content of tin in the second dielectric layer and a content of tin in the second layer is 0.5 atomic % or less.

6. The optical recording medium according to claim 4, wherein the atomic concentration of tin in the second layer is higher than an atomic concentration of tin in the first layer.

7. The optical recording medium according to claim 1, wherein the recording layer contains manganese oxide.

8. An optical recording medium comprising a plurality of information signal layers, wherein at least one of the plurality of information signal layers other than the farthest information signal layer from a light irradiation surface includes:

a recording layer;

a first dielectric layer provided on a side opposite to a light incident side of the recording layer; and
a second dielectric layer provided on the light incident side of the recording layer,
the first dielectric layer and the second dielectric layer include indium oxide and tin oxide, and
an atomic concentration of tin in the first dielectric layer in the vicinity of an interface on the light incident side is higher than an atomic concentration of tin in the second dielectric layer.

* * * * *